United States Patent
Song et al.

(10) Patent No.: US 7,503,690 B2
(45) Date of Patent: Mar. 17, 2009

(54) TEMPERATURE MEASUREMENT APPARATUS AND METHOD FOR MEASURING TEMPERATURES BY USING RF SIGNALS OF DIFFERENT FREQUENCIES

(75) Inventors: Il-jong Song, Suwon-si (KR); Ja-nam Ku, Yongin-si (KR); Young-hoon Min, Anyang-si (KR); Sang-wook Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 11/148,304

(22) Filed: Jun. 9, 2005

(65) Prior Publication Data

US 2005/0276307 A1 Dec. 15, 2005

(30) Foreign Application Priority Data

Jun. 10, 2004 (KR) ...................... 10-2004-0042578

(51) Int. Cl.
*G01J 5/00* (2006.01)
(52) U.S. Cl. ................... 374/127; 340/870.17; 374/117
(58) Field of Classification Search ................. 324/127; 374/127, 163; 340/5.61, 870.17
See application file for complete search history.

(56) References Cited

U.S. PATENT DOCUMENTS

| | | | | | |
|---|---|---|---|---|---|
| 4,065,758 | A | * | 12/1977 | Barbier et al. .............. 340/578 |
| 4,471,354 | A | * | 9/1984 | Smith .................... 340/870.17 |
| 5,697,090 | A | * | 12/1997 | Iura ........................... 455/316 |
| 5,755,512 | A | * | 5/1998 | White ........................ 374/161 |
| 6,256,483 | B1 | * | 7/2001 | Moerder et al. .......... 455/115.1 |
| 6,678,506 | B1 | * | 1/2004 | Dolman et al. ........... 455/127.3 |
| 6,811,308 | B2 | * | 11/2004 | Chapman et al. ............ 374/155 |
| 6,893,154 | B2 | * | 5/2005 | Gold et al. .................. 374/170 |
| 6,953,281 | B2 | * | 10/2005 | Hauenstein ................. 374/161 |
| 7,116,240 | B2 | * | 10/2006 | Hyde ......................... 340/661 |
| 2002/0150141 | A1 | * | 10/2002 | Kishi ......................... 374/141 |
| 2002/0181543 | A1 | * | 12/2002 | Yin ............................ 374/170 |

\* cited by examiner

*Primary Examiner*—Gail Verbitsky
*Assistant Examiner*—Megann E Vaughn
(74) *Attorney, Agent, or Firm*—Sughrue Mion, PLLC (57) ABSTRACT

Disclosed are a temperature measurement apparatus and method for measuring temperature by using RF signals having different frequencies. The temperature measurement apparatus includes a parameter generation unit for generating a first parameter based on a radio frequency (RF) signal having a first frequency and a second parameter based on an RF signal having a second frequency; a parameter detection unit for detecting the generated first and second parameters; and a control unit for calculating a temperature value based on the detected first and second parameters. Accordingly, the temperature measurement apparatus can measure temperature by use of existing components and received RF signals without any addition of a temperature sensor, as well as measure temperature precisely without having any influence on the intensities of RF signals that can vary due to the changes of transmission distances and signal-receiving environments.

20 Claims, 5 Drawing Sheets

TEMPERATURE MEASUREMENT APPARATUS AND METHOD FOR MEASURING TEMPERATURES BY USING RF SIGNALS OF DIFFERENT FREQUENCIES

CROSS-REFERENCE TO RELATED APPLICATIONS

This application claims benefit under 35 U.S.C. § 119 from Korean Patent Application No. 2004-42578, filed on Jun. 10, 2004, the entire content of which is incorporated herein by reference.

BACKGROUND OF THE INVENTION

1. Field of the Invention

The present invention relates to a temperature measurement apparatus and method, and more particularly a temperature measurement apparatus capable of measuring its own temperature and externally sending the measured temperature information, and a method thereof.

2. Description of the Related Art

With wireless technology developments in recent years, a variety of radio frequency identification (RFID) systems are being used, covering a broad range of applications such as simple pre-paid bus cards, parking lot ID cards, and R & D institute ID cards.

Figure 1:
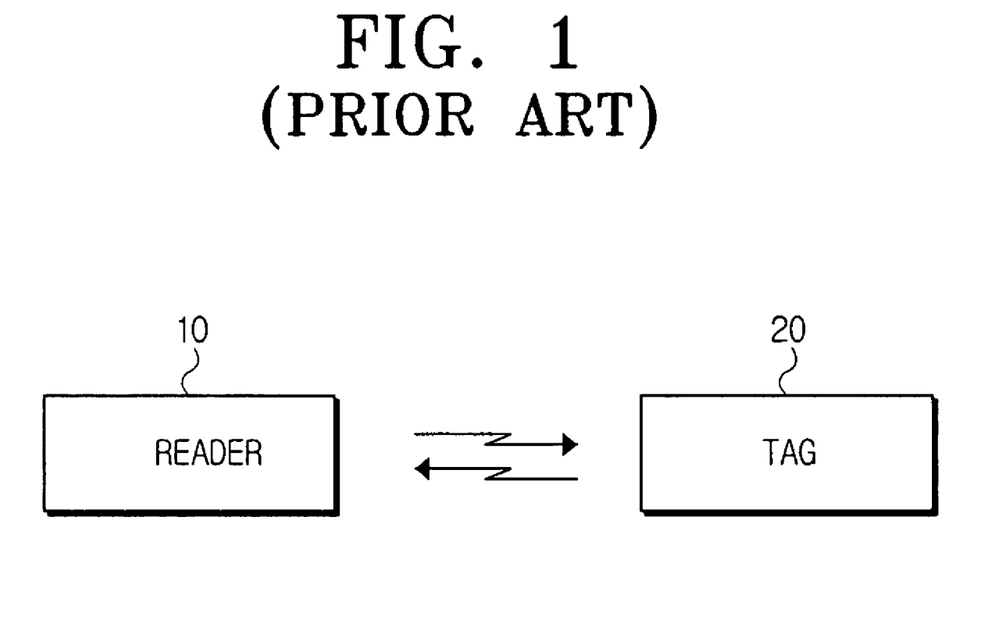
FIG. 1 is a block diagram showing a general radio frequency identification (RFID) system.

FIG. 1 is a block diagram showing a general RFID system. In FIG. 1, the RFID system has a reader 10 and a tag 20. The tag 20 can be fabricated in any of diverse forms such as a card, a sticker, and so on, depending on users' convenience and usage.

The radio frequency authentication process is carried out at the time when radio frequency signals (RF signals) are exchanged between the reader 10 and the tag 20. That is, if the IC (not shown) of the tag 20 outputs in the RF signal form information stored in its own memory and necessary for authentication, the reader 10 receives the signal and performs authentication.

Further, if it is necessary to send additional data such as temperature and the like in addition to basic data required for authentication, a temperature sensor can be added in the tag 20 in order for temperature data measured by the temperature sensor to be sent together with the basic data.

Therefore, the RFID system can be used as a temperature measurement system in wireless environments, and the tag 20 can be used as a temperature measurement apparatus of objects to which the tag 20 is fixed.

As stated above, in order for the tag 20 to be used as a temperature measurement apparatus, a temperature sensor has to be added thereto. However, the addition of the temperature sensor to the tag 20 causes a problem of increasing the size of the tag 20 as well as the manufacturing cost of the tag 20. Further, such an addition brings a problem of electric power loss caused by the temperature sensor.

Thus, there is demand for an approach capable of measuring temperature by use of components existing in the tag 20 without the addition of the temperature sensor to the tag 20.

SUMMARY OF THE INVENTION

The present invention has been developed in order to address the above drawbacks and other problems associated with the conventional arrangement. An aspect of the present invention is to provide a temperature measurement apparatus and method capable of measuring temperature by use of existing components and RF signals without a temperature sensor separately added.

Another aspect of the present invention is to provide a temperature measurement apparatus and method capable of precisely measuring temperature regardless of RF signal intensity that can vary due to signal-transmission distance and signal-reception circumstances.

The foregoing and other objects and advantages are substantially realized by providing a temperature measurement apparatus, comprising a parameter generation unit for generating a first parameter based on a radio frequency (RF) signal having a first frequency and a second parameter based on an RF signal having a second frequency; a parameter detection unit for detecting the generated first and second parameters; and a control unit for calculating a temperature value based on the detected first and second parameters.

Further, preferably, but not necessarily, the first and second frequencies are frequencies of a super high frequency (SHF) band.

Consistent with another embodiment of the invention, the RF signals having the first and second frequencies are inputted at a certain time interval.

Consistent with another embodiment of the invention, the first parameter is a first voltage difference being a difference between a voltage generated based on an RF signal having a ratio of the first frequency to a first intensity and a voltage generated based on an RF signal having a ratio of the first frequency to a second intensity, and the second parameter is a second voltage difference which is a difference between a voltage generated based on an RF signal having a ratio of the second frequency to the first intensity and a voltage generated based on an RF signal having a ratio of the second frequency to the second intensity.

Consistent with another embodiment of the invention, the control unit calculates a first voltage sensitivity by using the first voltage difference and the first and second voltage sensitivities, calculates a second voltage sensitivity by using the second voltage difference and the first and second intensities, and calculates the temperature value by using a voltage sensitivity difference which is a difference between the first voltage sensitivity and the second voltage sensitivity.

Consistent with another embodiment of the invention, the temperature measurement apparatus further comprises a memory unit for storing the temperature value corresponding to the voltage sensitivity difference, wherein the control unit calculates the temperature value with reference to the memory unit.

Consistent with another embodiment of the invention, the temperature measurement apparatus further comprises a transmission signal generation unit for generating an external transmission signal carrying information of the calculated temperature value.

Meanwhile, consistent with another embodiment of the invention the temperature measurement method comprises steps of generating a first parameter based on an RF signal having a first frequency; detecting the generated first parameter; generating a second parameter based on an RF signal having a second frequency; detecting the generated second parameter; and calculating a temperature value based on the detected first and second parameters.

Further, preferably, but not necessarily, the first and second frequencies are frequencies of a super high frequency (SHF) band.

Further, preferably, but not necessarily, the RF signals having the first and second frequencies are inputted at a predetermined time interval.

Consistent with another embodiment of the invention, the first parameter is a first voltage difference which is a difference between a voltage generated based on an RF signal having a ratio of the first frequency to a first intensity and a voltage generated based on an RF signal having a ratio of the first frequency to a second intensity, and the second parameter is a second voltage difference which is a difference between a voltage generated based on an RF signal having a ratio of the second frequency to the first intensity and a voltage generated based on an RF signal having a ratio of the second frequency to the second intensity.

Consistent with another embodiment of the invention, the calculation step calculates a first voltage sensitivity by using the first voltage difference and the first and second voltage sensitivities, calculates a second voltage sensitivity by using the second voltage difference and the first and second intensities, and calculates the temperature value by using a voltage sensitivity difference being a difference between the first voltage sensitivity and the second voltage sensitivity.

Consistent with another embodiment of the invention, the temperature measurement method further comprises a step of generating an external transmission signal carrying information of the calculated temperature value.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Hereinafter, the present invention will be described in detail with reference to the accompanying drawings.

Figure 2:
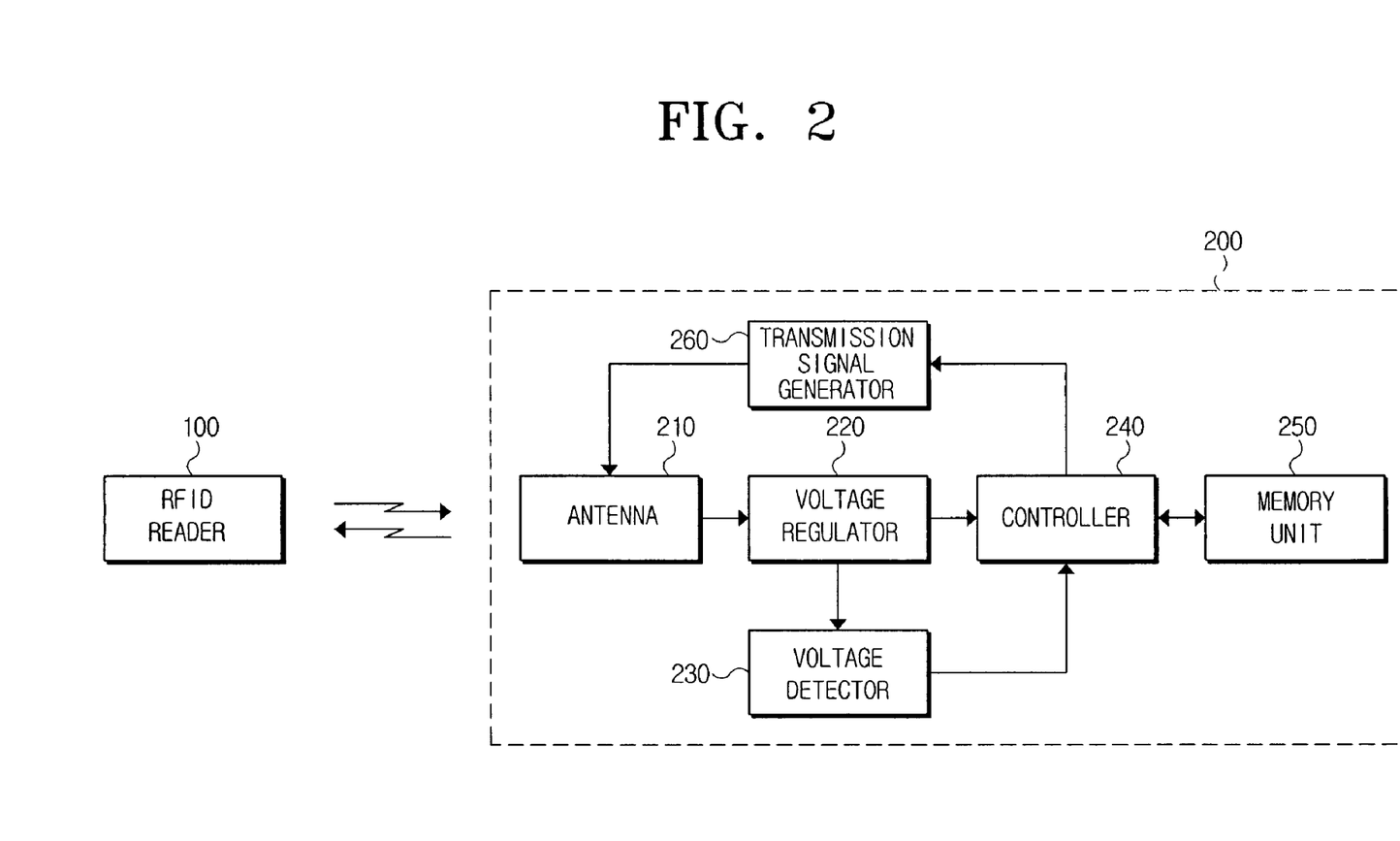
FIG. 2 is a block diagram showing a radio frequency identification tag as a temperature measurement apparatus according to an embodiment of the present invention.

FIG. 2 is a block diagram showing in detail a radio frequency identification tag as a temperature measurement apparatus according to an embodiment of the present invention. For convenience of understanding, FIG. 2 shows a radio frequency identification (RFID) reader 100 in addition to a radio frequency identification (RFID) tag 200 which can be used as a temperature measurement apparatus.

The RFID reader 100 sends and receives RF signals to and from the RFID tag 200. Here, there are various frequencies and intensities of the RF signals which are sent from the RFID reader 100 to the RFID tag 200. In detail, in this embodiment the RFID reader 100 sends to the RFID tag 200 a 900 MHz/1 mW RF signal of the Ultra High Frequency (UHF) band, a 10 GHz/1 mW RF signal, a 10 GHz/2 mW RF signal, a 20 GHz/1 mW RF signal, and a 20 GHz/2 mW RF signal of the Super High Frequency (SHF) band. Here, the RFID reader 100 sends the respective RF signals at a certain time interval.

If the RFID tag 200 receives the 900 MHz/1 mW RF signal, the RFID tag 200 generates and sends an RF signal carrying its own basic data to the RFID reader 100, using the received 900 MHz/1 mW RF signal. Further, if the RFID tag 200 sequentially receives the 10 GHz/1 mW RF signal, 10 GHz/2 mW RF signal, 20 GHz/1 mW RF signal, and 20 GHz/2 mW RF signal, the RFID tag 200 measures its own temperature, and generates and sends an RF signal carrying the measured temperature value to the RFID reader 100, using the received RF signals.

Hereinafter, the 10 GHz frequency is denoted as f1, the 20 GHz frequency as f2, the 1 mW power level as P1, and the 2 mW power level as P2, for convenience of explanation.

The RFID tag 200 has an antenna 210, a voltage regulator 220, a voltage detector 230, a controller 240, a memory unit 250, and a transmission signal generator 260.

The antenna 210 sends and receives RF signals to and from the RFID reader 100. If the antenna 210 receives an RF signal, an AC voltage is induced in the voltage regulator 220. Here, the frequency of the induced AC voltage is the same as the received RF signal, and the intensity or power of the AC voltage is proportional to the intensity of the received RF signal.

As a result, if the antenna 210 receives an RF signal of f1/P1 and an RF signal of f1/P2, the antenna 210 induces an AC voltage of f1 in the voltage regulator 220, and, if the antenna 210 receives an RF signal of f2/P1 and an RF signal of f2/P2, the antenna 210 induces an AC voltage of f2 in the voltage regulator 220. Here, the intensity of each induced AC voltage has an attenuated value of the intensity, P1 or P2, of each RF signal received at the antenna 210.

The voltage regulator 220 regulates an AC voltage induced by the antenna 210, and generates a DC voltage. The DC voltage generated from the voltage regulator 220 is used as a driving voltage of the RFID tag 200.

Figure 3:
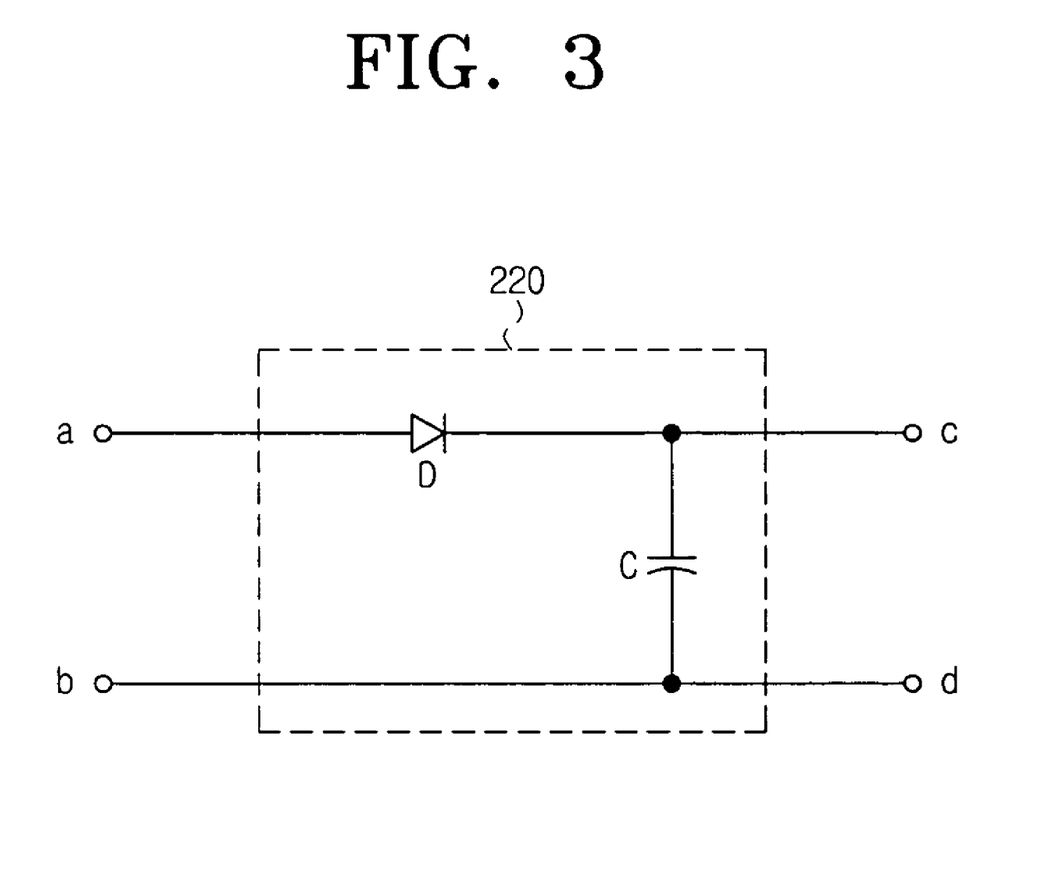
FIG. 3 is a view showing a circuit of the voltage regulator of FIG. 2.

FIG. 3 is a view showing a circuit of the voltage regulator 220. As shown in FIG. 3, the voltage regulator 220 can be implemented with a combination of a schottky diode D and a capacitor C.

The schottky diode D is a diode using the schottky barrier, that is, the function of suppressing a reverse voltage on the contact surface of a conductor and an N-type semiconductor when the conductor are connected with the N-type semiconductor. The schottky diode is suitable for a voltage regulation circuit of a high frequency voltage source due to a smaller forward voltage than a PN diode, so the schottky diode is used for the voltage regulator 220 of the RFID tag 200.

Meanwhile, the schottky diode D has characteristics that change the voltage sensitivity with temperature. Due to such characteristics, the schottky diode D can be used as a temperature sensor.

In order for the schottky diode D to be used as a temperature sensor, the voltage sensitivity linearity of the schottky diode D has to be guaranteed. The voltage sensitivity of the schottky diode D has an excellent linearity when a high-frequency voltage is applied as compared to when a low-frequency voltage is applied. That is, the voltage sensitivity of the schottky diode D has better linearity when an AC voltage of f1 or f2 is applied across the input terminals a and b than when a 900 MHz AC voltage is applied. Therefore, it is preferable to use the AC voltage of f1 and f2 as a temperature detection voltage.

Further, the schottky diode D has different degrees and change rates of its voltage sensitivity depending on the magnitudes of AC voltage frequencies. In detail, as an AC voltage of higher frequency is applied, the degree of the voltage sensitivity becomes larger, but the change rate of the same becomes degraded.

Figure 4A:
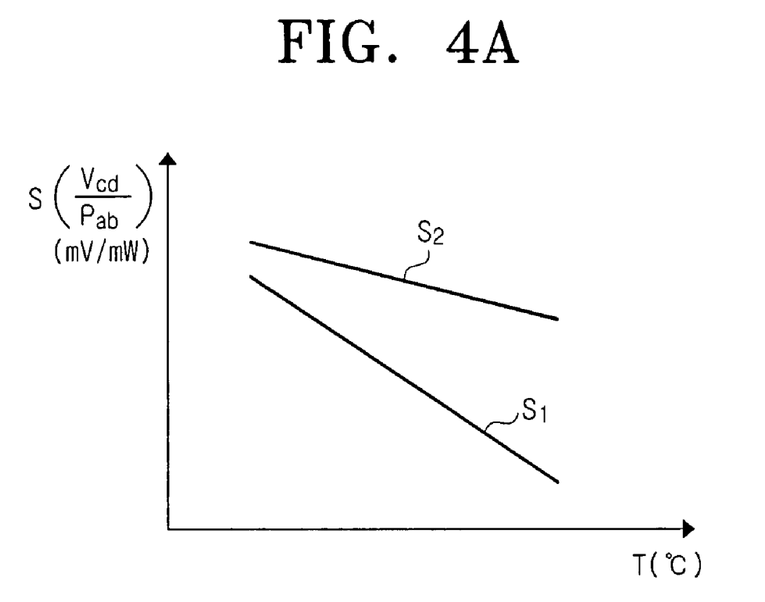
FIG. 4A is a graph showing the voltage sensitivity characteristics of a schottky diode with temperature changes.

FIG. 4A is a graph showing the voltage sensitivity characteristics of the schottky diode D with temperature changes. FIG. 4A shows the voltage sensitivities, S=Vcd/Pab, of the schottky diode D as the temperature T changes when applied with an AC voltage of f1 and an AC voltage of f2, respectively, across the input terminals a and b of the voltage regulator 220. In FIG. 4A, 'S1' indicates a voltage sensitivity when the AC voltage of f1 is applied, and 'S2' indicates a voltage sensitivity when the AC voltage of f2 is applied. As shown in FIG. 4A, when a voltage of high frequency f2 is applied, the voltage sensitivity S2 increases, but the change rate becomes decreased.

Referring back to FIG. 2 and FIG. 3, the voltage detector 230 detects a voltage Vcd across the output terminals c and d of the voltage regulator 220. In detail, the voltage detector 230 detects a voltage (hereinafter, referred to as 'V11') across the output terminals c and d when an AC voltage is applied that is induced across the input terminals a and b of the voltage regulator 220 by an RF signal of f1/P1, and detects a voltage (hereinafter, referred to as 'V12') across the output terminals c and d when an AC voltage is applied that is induced across the input terminals a and b of the voltage regulator 220 by an RF signal of f1/P2 after a certain period of time. Further, the voltage detector 230 detects a voltage (hereinafter, referred to as 'V21') across the output terminals c and d when an AC voltage is applied that is induced across the input terminals a and b of the voltage regulator 220 by an RF signal of f2/P1, and detects a voltage (hereinafter, referred to as 'V22') across the output terminals c and d when an AC voltage is applied that is induced across the input terminals a and b of the voltage regulator 220 by an RF signal of f2/P2 after a certain period of time.

The controller 240 calculates a temperature value T by using V11, V12, V21, V22, P1, and P2 detected by the voltage detector 230.

In detail, the controller 240 calculates the voltage sensitivity (hereinafter, referred to as S1) of the schottky diode D when an AC voltage of f1 is applied and the voltage sensitivity (hereinafter, referred to as S2) of the schottky diode D when an AC voltage of f2 is applied, according to Equation 1 as follows:

$$S_1 = \frac{V_{12} - V_{11}}{P_2 - P_1}$$ [Equation 1]

$$S_2 = \frac{V_{22} - V_{21}}{P_2 - P_1}$$

Further, the controller 240 calculates a voltage sensitivity difference (hereinafter, referred to as ΔS) of the schottky diode D, and calculates a temperature value T by using the difference, based on Equation 2 as follows:

$$\Delta S = S_2 - S_1$$ [Equation 2]

Figure 4B:
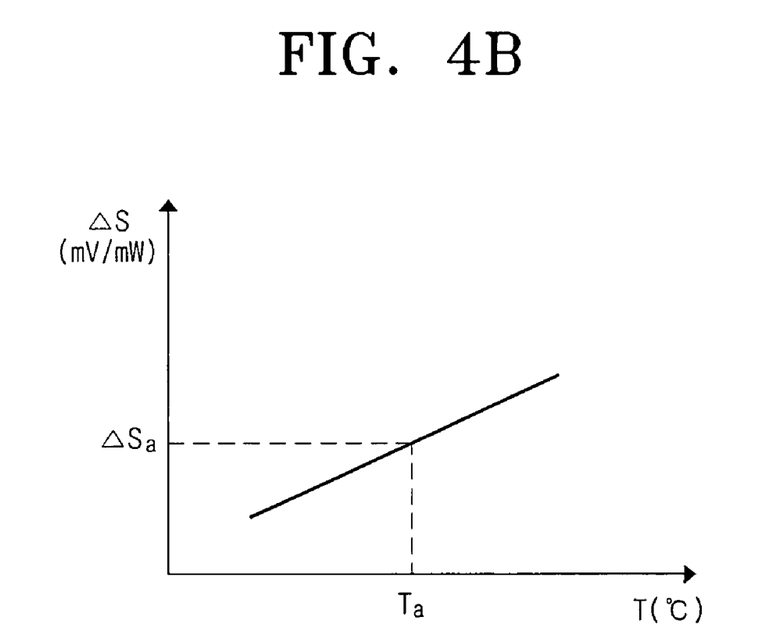
FIG. 4B is a graph showing the voltage sensitivity differences of a schottky diode with temperature changes.

FIG. 4B is a graph for showing the characteristics of ΔS with the changes of temperature T. The graph as shown in FIG. 4B corresponds to a difference between S2 and S1 shown in FIG. 4A. The controller 240 calculates ΔS, and then can calculates a value of the temperature T by using the graph. For example, if the ΔS calculated by the controller 240 is ΔSa, a corresponding temperature value Ta can be calculated on the graph of FIG. 4B.

Meanwhile, the graph shown in FIG. 4B can be pre-stored in the memory unit 250 by databasing temperature values corresponding to ΔS. Here, the controller 240 calculates the ΔS, and then calculates a temperature value corresponding to the calculated ΔS with reference to the data stored in the memory unit 250.

In addition, the memory unit 250 also stores basic data necessary for authentication. The basic data can be name, date of birth, status, and so on, in case that an object to which the tag 100 is fixed is a human, and can be information such as article type, manufacturing date, and so on, in case of an article.

The transmission signal generator 260 generates and sends to the RFID reader 100 an RF signal carrying the basic data stored in the memory unit 250 or a temperature value calculated in the controller 240.

Figure 5:
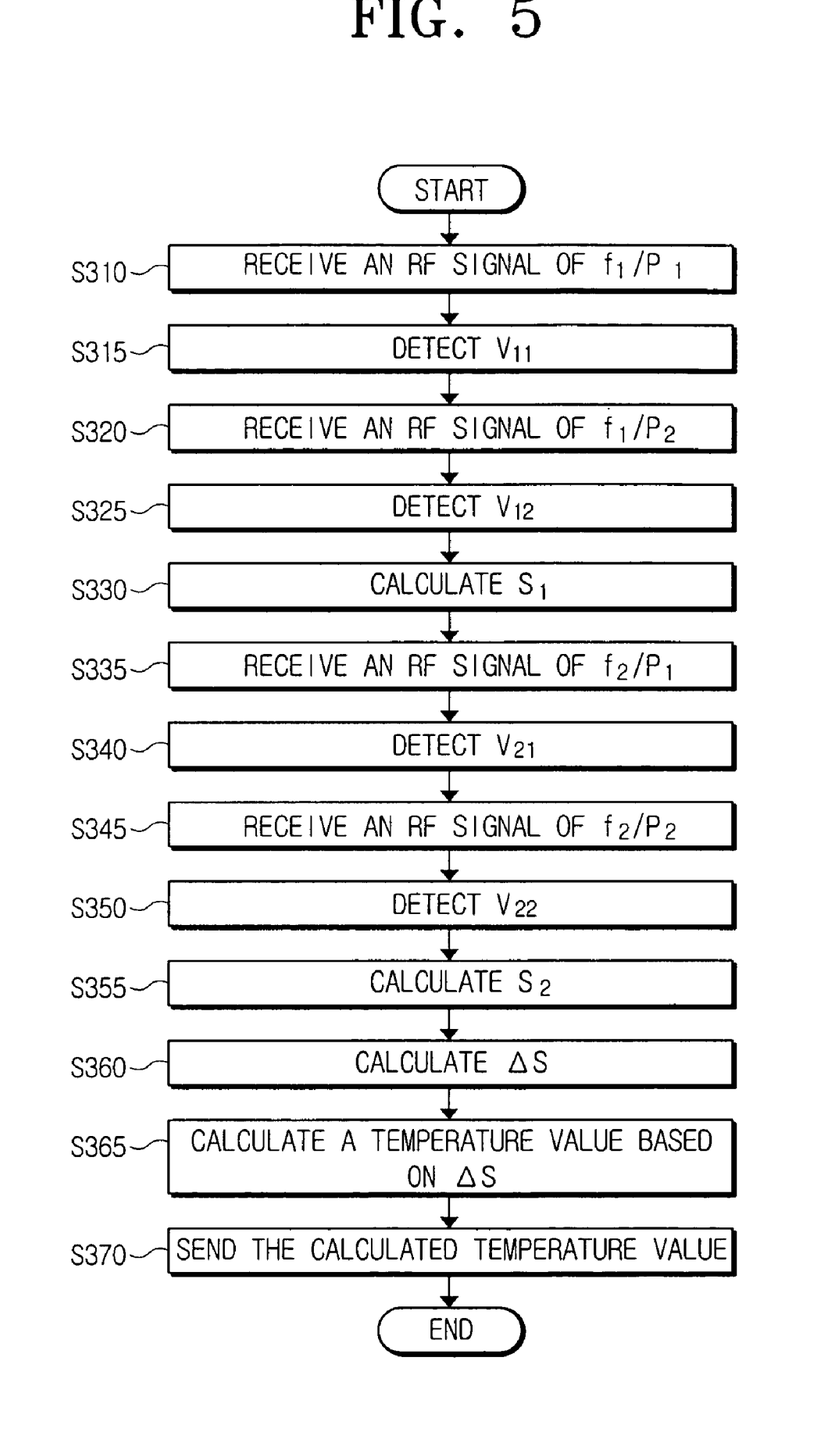
FIG. 5 is a flow chart for explaining a method of measuring temperature by use of RF signals of different frequencies according to an embodiment of the present invention.

Hereinafter, description will be made in detail on how the RFID tag 200 shown in FIG. 2 measures temperature with reference to FIG. 5. FIG. 5 is a flow chart for explaining a method of measuring temperature by using RF signals of different frequencies according to an embodiment of the present invention.

First, the antenna 210 receives an RF signal of f1/P1 from the RFID reader 100 (S310). Such a received RF signal of f1/P1 induces an AC voltage across the input terminals a and b of the voltage regulator 220. Here, the voltage detector 230 detects a voltage V11 across the output terminals c and d of the voltage regulator 220 (S315).

Next, the antenna 210 receives an RF signal of f1/P2 from the RFID reader 100 (S320). Such a received RF signal of f1/P2 induces and applies an AC voltage across the input terminals a and b of the voltage regulator 220. Here, the voltage detector 230 detects a voltage V12 across the output terminals c and d of the voltage regulator 220 (S325).

Next, the controller 240 calculates S1 by using the detected voltages V11 and V12 (S330). Here, the controller 240 calculates S1 based on Equation 1 as above.

Next, the antenna 210 receives an RF signal of f2/P1 from the RFID reader 100 (S335). Such a received RF signal of f2/P1 induces and applies an AC voltage across the input terminals a and b of the voltage regulator 220. Here, the voltage detector 230 detects a voltage V21 across the output terminals c and d of the voltage regulator 220 (S340).

Next, the antenna 210 receives an RF signal of f2/P2 from the RFID reader 100 (S345). Such a received RF signal of f2/P2 induces and applies an AC voltage across the input terminals a and b of the voltage regulator 220. Here, the voltage detector 230 detects a voltage V22 across the output terminals c and d of the voltage regulator 220 (S350).

Next, the controller 240 calculates S2 by using the detected voltages V21 and V22 (S350). Here, the controller 240 calculates S2 based on Equation 1 as above.

The controller 240 calculates ΔS, using S1 and S2 (S360). Here, the controller 240 calculates ΔS based on Equation 2 as above. Further, the controller 240 calculates a temperature value based on ΔS (S365). The temperature value based on ΔS can be calculated by using the graph of ΔS versus the changes of temperature T as shown in FIG. 4B.

Further, if the graph shown in FIG. 4B is databased with temperature values corresponding to ΔS and pre-stored in the memory unit 250, it is possible that the controller 240 calculates ΔS and then calculates a temperature value with reference to the data stored in the memory 250.

The transmission signal generator 260 generates and sends an RF signal carrying the temperature value calculated by the controller 240 to the RFID reader 100 through the antenna 210 (S370). Here, the transmission signal generator 260 can also send the basic data stored in the memory unit 250.

The present invention receives four RF signals having different frequencies and intensities from the RFID reader 100, calculates voltage sensitivities by frequencies by using a difference between different voltages induced by the RF signals, and calculates a temperature value by using a difference between the calculated voltage sensitivities. Thus, even though the intensity of an RF signal varies depending on the position and direction of the RFID tag 200 and a distance between the RFID reader 100 and RFID tag 200, the present invention can precisely calculate a temperature value without influence of the varying intensity.

Further, the present invention uses a schottky diode D as a device which varies the voltage sensitivity with the change of temperature. However, the diode D is only an example, and any device can be used that varies the voltage sensitivity with the change of temperature, including general diodes.

Further, when RF signals of different frequencies and intensities are received for temperature measurements, the present invention calculates and uses a voltage occurring at the output port of the voltage regulator 220. However, such a voltage is only an example, and a voltage at any part of the voltage regulator 220 can be used for a voltage to be measured. Thus, the present invention can be implemented by calculating a voltage across the schottky diode of the voltage regulator 220. Further, in the same manner as the voltage, current or impedance can be measured as a parameter.

So far, description has been made of the RFID tag 200 that can be used as a temperature measurement apparatus for convenience of understanding, but this is only one embodiment of the present invention. That is, the technical idea of the present invention can be applied for implementation to any apparatus capable of receiving RF signals of two or more different frequencies and measuring temperature by using the received RF signals.

Further, the present invention exemplarily uses a 10 GHz/1 mW RF signal, 10 GHz/2 mW RF signal, 20 GHz/1 mW RF signal, and 20 GHz/2 mW RF signal, but there is no limit to the frequencies and intensities of RF signals.

As aforementioned, the present invention can measure temperature by use of existing components and received RF signals without any addition of a temperature sensor, as well as measure temperature precisely without having any influence on the intensities of RF signals that can vary due to the changes of transmission distances and signal-receiving environments.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A temperature measurement apparatus, comprising:
    a parameter generation unit configured to generate a first parameter based on a radio frequency (RF) signal having a first frequency and a second parameter based on an RF signal having a second frequency;
    a parameter detection unit configured to detect the generated first and second parameters; and
    a control unit configured to calculate a temperature value based on the detected first and second parameters,
    wherein the first parameter is generated based on at least an intensity of the radio frequency signal having the first frequency.

2. The temperature measurement apparatus as claimed in claim 1, wherein the first and second frequencies are frequencies of a super high frequency (SHF) band.

3. The temperature measurement apparatus as claimed in claim 2, wherein the RF signals having the first and second frequencies are inputted at a certain time interval.

4. The temperature measurement apparatus as claimed in claim 3, wherein the first parameter is a first voltage difference being a difference between a voltage generated based on an RF signal having a ratio of the first frequency to a first intensity and a voltage generated based on an RF signal having a ratio of the first frequency to a second intensity, and the second parameter is a second voltage difference being a difference between a voltage generated based on an RF signal having a ratio of the second frequency to the first intensity and a voltage generated based on an RF signal having a ratio of the second frequency to the second intensity.

5. The temperature measurement apparatus as claimed in claim 4, wherein the control unit calculates a first voltage sensitivity by using the first voltage difference and the first and second intensities, calculates a second voltage sensitivity by using the second voltage difference and the first and second intensities, and calculates the temperature value by using a voltage sensitivity difference being a difference between the first voltage sensitivity and the second voltage sensitivity.

6. The temperature measurement apparatus as claimed in claim 5, further comprising:
    a memory unit configured to store the temperature value corresponding to the voltage sensitivity difference, wherein the control unit calculates the temperature value with reference to the memory unit.

7. The temperature measurement apparatus as claimed in claim 5, wherein the first voltage sensitivity and second voltage sensitivity is calculated as, $$S_1 = (V_{12} - V_{11})/(P_2 - P_1)$$

$$S_2 = (V_{22} - V_{21})/(P_2 - P_1)$$

in which $S_1$ is the first voltage sensitivity, $(V_{12} - V_{11})$ is the first voltage difference, $P_1$ is the first intensity, $P_2$ is the second intensity, $S_2$ is the second voltage sensitivity, and $(V_{22} - V_{21})$ is the second voltage difference.

8. The temperature measurement apparatus as claimed in claim 1, further comprising:
    a transmission signal generation unit configured to generate an external transmission signal carrying information of the calculated temperature value.

9. The temperature measurement apparatus as claimed in claim 1, wherein the first parameter is a first voltage difference being a difference between a voltage generated based on an RF signal having a ratio of the first frequency to a first intensity and a voltage generated based on an RF signal having a ratio of the first frequency to a second intensity, and the second parameter is a second voltage difference being a difference between a voltage generated based on an RF signal having a ratio of the second frequency to the first intensity and a voltage generated based on an RF signal having a ratio of the second frequency to the second intensity.

10. The temperature measurement apparatus as claimed in claim 9, wherein the control unit calculates a first voltage sensitivity by using the first voltage difference and the first and second intensities, calculates a second voltage sensitivity by using the second voltage difference and the first and second intensities, and calculates the temperature value by using a voltage sensitivity difference being a difference between the first voltage sensitivity and the second voltage sensitivity.

11. The temperature measurement apparatus as claimed in claim 10, further comprising:
a memory unit configured to store the temperature value corresponding to the voltage sensitivity difference, wherein the control unit calculates the temperature value with reference to the memory unit.

12. The temperature measurement apparatus as claimed in claim 1, wherein the first frequency and the second frequency are independent of each other.

13. A temperature measurement method, comprising:
generating a first parameter based on an RF signal having a first frequency;
detecting the generated first parameter;
generating a second parameter based on an RF signal having a second frequency;
detecting the generated second parameter; and
calculating a temperature value based on the detected first and second parameters,
wherein the first parameter is generated based on at least an intensity of the RF signal having the first frequency.

14. The temperature measurement method as claimed in claim 13, wherein the first and second frequencies are frequencies of a super high frequency (SHF) band.

15. The temperature measurement method as claimed in claim 14, wherein the RF signals having the first and second frequencies are inputted at a predetermined time interval.

16. The temperature measurement method as claimed in claim 15, wherein the first parameter is a first voltage difference being a difference between a voltage generated based on an RF signal having a ratio of the first frequency to a first intensity and a voltage generated based on an RF signal having a ratio of the first frequency to a second intensity, and the second parameter is a second voltage difference being a difference between a voltage generated based on an RF signal having a ratio of the second frequency to the first intensity and a voltage generated based on an RF signal having a ratio of the second frequency to the second intensity.

17. The temperature measurement method as claimed in claim 16, wherein the calculating operation calculates a first voltage sensitivity by using the first voltage difference and the first and second intensities, calculates a second voltage sensitivity by using the second voltage difference and the first and second intensities, and calculates the temperature value by using a voltage sensitivity difference being a difference between the first voltage sensitivity and the second voltage sensitivity.

18. The temperature measurement method as claimed in claim 13, further comprising:
generating an external transmission signal carrying information of the calculated temperature value.

19. The temperature measurement method as claimed in claim 13, wherein the first parameter is a first voltage difference being a difference between a voltage generated based on an RF signal having a ratio of the first frequency to a first intensity and a voltage generated based on an RF signal having a ratio of the first frequency to a second intensity, and the second parameter is a second voltage difference being a difference between a voltage generated based on an RF signal having a ratio of the second frequency to the first intensity and a voltage generated based on an RF signal having a ratio of the second frequency to the second intensity.

20. The temperature measurement method as claimed in claim 19, wherein the calculating operation calculates a first voltage sensitivity by using the first voltage difference and the first and second intensities, calculates a second voltage sensitivity by using the second voltage difference and the first and second intensities, and calculates the temperature value by using a voltage sensitivity difference being a difference between the first voltage sensitivity and the second voltage sensitivity.

* * * * *